United States Patent
Zeuch et al.

(12) 
(10) Patent No.: US 9,578,979 B1
(45) Date of Patent: Feb. 28, 2017

(54) MOUNTING SYSTEM FOR COLLECTABLES AND MOUNTING SYSTEM PACKAGING

(71) Applicants: William L. Zeuch, Wheaton, IL (US); Thomas J. Lanagan, Wheaton, IL (US)

(72) Inventors: William L. Zeuch, Wheaton, IL (US); Thomas J. Lanagan, Wheaton, IL (US)

(73) Assignee: ComicLock, LLC, Wheaton, IL (US)

( * ) Notice: Subject to any disclaimer, the term of this patent is extended or adjusted under 35 U.S.C. 154(b) by 309 days.

(21) Appl. No.: 14/513,142

(22) Filed: Oct. 13, 2014

Related U.S. Application Data

(60) Provisional application No. 61/890,148, filed on Oct. 11, 2013.

(51) Int. Cl.
| | |
|---|---|
| *F16M 11/00* | (2006.01) |
| *A47G 1/16* | (2006.01) |
| *A47B 97/04* | (2006.01) |
| *A47B 97/08* | (2006.01) |
| *A47B 23/04* | (2006.01) |
| *A47B 23/06* | (2006.01) |

(52) U.S. Cl.
CPC .............. *A47G 1/16* (2013.01); *A47B 23/042* (2013.01); *A47B 23/043* (2013.01); *A47B 23/06* (2013.01); *A47B 97/04* (2013.01); *A47B 97/08* (2013.01); *F16M 11/00* (2013.01)

(58) Field of Classification Search
CPC ........ F16M 11/00; F16M 11/04; A47B 23/06; A47B 97/04; A47B 97/08; A47B 23/042; A47B 23/043
USPC ......... 40/745, 746, 747, 748, 754, 734, 764; 248/447.1, 447.2, 448, 917, 924
See application file for complete search history.

(56) References Cited

U.S. PATENT DOCUMENTS

| | | | | |
|---|---|---|---|---|
| 2,112,583 | A * | 3/1938 | Tucker | G09F 1/14 40/734 |
| 4,217,710 | A * | 8/1980 | Becker | A47G 1/0638 248/488 |
| 5,365,682 | A * | 11/1994 | Eubank, Jr. | A47G 1/0644 40/746 |
| 9,194,536 | B2 * | 11/2015 | Kim | F16M 13/00 |
| 2008/0230672 | A1 * | 9/2008 | Pachowski | A47B 23/044 248/453 |
| 2008/0283714 | A1 * | 11/2008 | Behroozi | A47B 23/04 248/441.1 |

* cited by examiner

*Primary Examiner* — Syed A Islam
(74) *Attorney, Agent, or Firm* — John F. Rollins

(57) ABSTRACT

A collectable mounting device is configurable to a wall-mounted configuration, and a horizontal support surface (or shelf) mounted configuration. In the wall-mounted configuration, support members are secured together via a fastener through the adjustment slots such that support channels extend in the same direction to support the collectable on a wall. In the shelf-mounted configuration, the support members are fastened together such that the support channels extend in opposite directions, and a tensioning member is inserted between the support members in opposed tensioning member receiving slots to flex the support members away from each other. A packaging method includes stacking the support members and tensioning member to align holes therein; wrapping a label around the stacked support members and tensioning member to align holes in the label and holes in the support members and tensioning member; and inserting a fastener through the aligned holes.

16 Claims, 3 Drawing Sheets

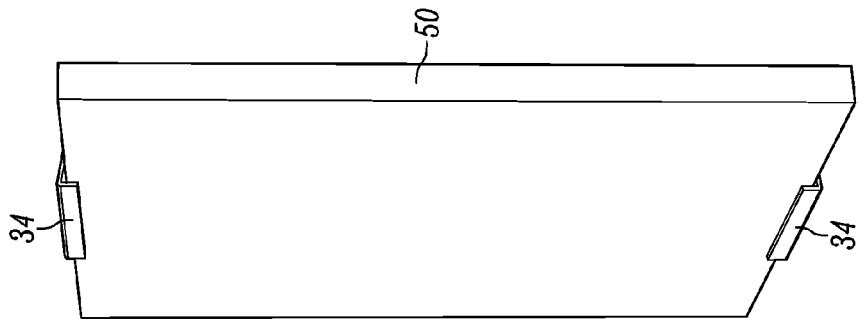
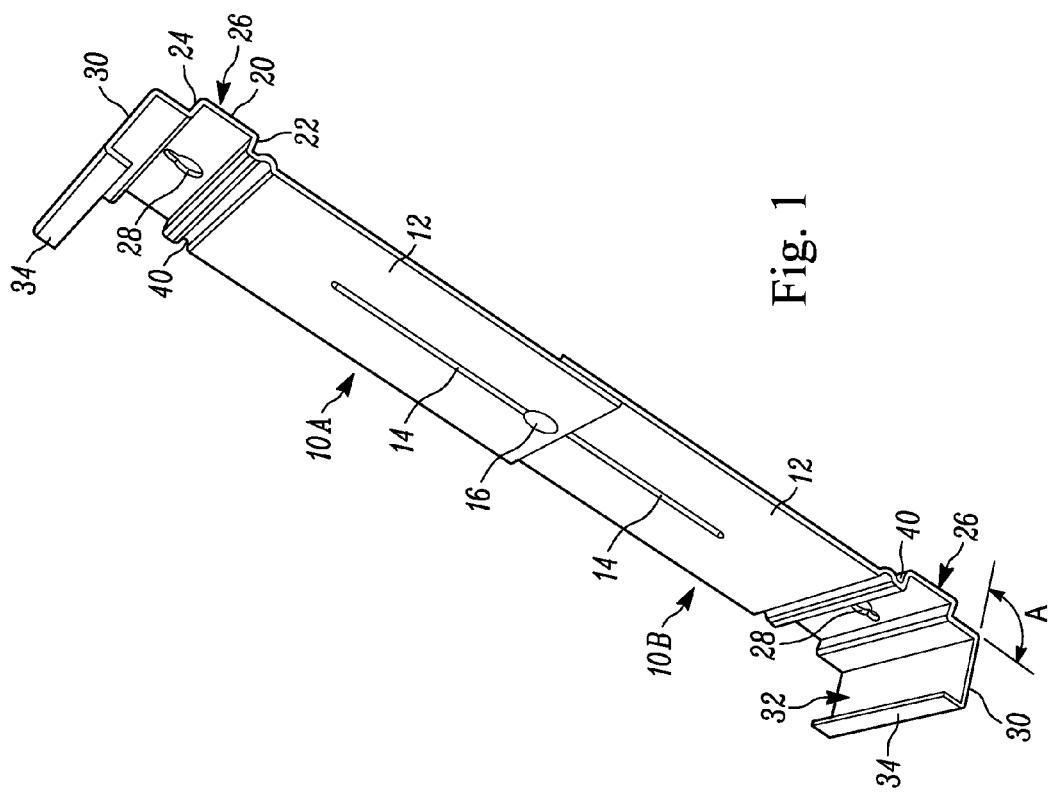

MOUNTING SYSTEM FOR COLLECTABLES AND MOUNTING SYSTEM PACKAGING

PRIORITY CLAIM AND CROSS-REFERENCE TO RELATED APPLICATIONS

This document hereby claims the benefit of priority under all applicable laws, treaties and provisions to U.S. Provisional Patent Application Ser. No. 61/890,148, filed on Oct. 11, 2013, and titled "MOUNTING SYSTEM FOR COLLECTABLES AND MOUNTING SYSTEM PACKAGING," the disclosure of which is expressly hereby incorporated by reference herein in its entirety.

BACKGROUND

1. Technical Field

The disclosure relates to mounting and display devices and systems, mounting and for displaying collectable items, such as comic books, vinyl albums, books, magazines, and figurines. The disclosure also relates to packaging for mounting system products and to methods for assembling a package for a mounting system.

2. Prior Art

Devices for mounting pictures and collectables, such as comic books, on a wall or shelf are generally known. Prior art mounting devices are generally complex in their design and therefore relatively costly to manufacture. Moreover, when a person desires to change the mounted location of their collectable from a wall mount to a standing mount, such as a shelf, they must typically purchase a new mounting system at an added cost. Thus, one challenge in the relevant art is to provide versatile mounting systems that are easily adaptable to both hanging and standing mounting configurations.

Another challenge in the relevant art is to provide collectable mounting systems that may be manufactured from inexpensive materials, yet which provide for stable, secure and aesthetically pleasing mounting of the collectables.

Yet another challenge is to provide packaging configurations and packaging assembly methods for display systems that provide for compact packaging, so as to reduce shipping costs and retail store "footprint," and which are environmentally friendly and reduce waste.

There is thus a need in the art for display systems that address the aforementioned problems in the prior art. The subject matter of the present disclosure is directed to overcoming, or at least reducing the effects of, one or more of the problems or needs set forth above, and others.

SUMMARY OF THE INVENTION

According to an aspect of the invention, a mounting system is provided with the ability to function as both a wall mounting device and a standing or shelf mounting device for a collectable or other displayed item. The mounting system may include a mounting device that is configurable to a wall-mounted configuration, in which the mounting device supports a collectable on a wall, and a horizontal support surface (or shelf) mounted configuration, in which the mounting device supports a collectable on a horizontal surface, such as a shelf. The mounting system may include two generally J-shaped support members, each including a generally planar body portion having an adjustment slot formed therein. The support members may also include a tensioning member retaining ridge adjacent the planar body portion, an offset portion adjacent the tensioning member receiving channel, and a support channel formed adjacent the offset portion and extending in a generally opposite direction from the offset portion.

Assembled in a wall mount configuration, the two generally J-shaped support members may be adjustably connected via a fastener disposed in the aligned adjustment slots and such that the respective support channel of each support member extend on the same side of the assembly. The length of the assembly may be adjusted to an appropriate size such that the support channels engage ends of the collectable and secure it on the assembly. Hanging notches formed in the offsets portions may receive a wall hanging fastener. The offset portions engage a wall and hold the collectable in a position in which it is displaced from the wall. From a frontal direction, the only visible portions of the assembly are the retaining lips, which extend slightly over the edges of the top and bottom edges of the collectable. The support channels may extend at an obtuse (greater than 90 degree) angle such that gravity forces the bottom edge of the collectable towards the front of the lower support channel. The support elements may be formed of a transparent material. Thus, the mounting system may be almost entirely hidden from view and unnoticed by an observer, such that the collectable is displayed with an effect that it seems to "float" above the wall in an aesthetically pleasing manner.

In a standing, or horizontal support surface mount configuration, the support members may be oriented such that they form a generally triangular structure, with the support channel of each support member extending on opposite sides of the assembly and forming base members that provide for stable support on a horizontal surface. A tensioning member is inserted into the tension member-receiving slot and forces and flexes the support members away from each other, creating tension in the support members and increasing the stability and strength of the assembly in supporting the collectable on a horizontal surface.

The support channels may extend outward from the support member planar section with a slightly obtuse angle such that the collectible is forced by gravity towards the front of the channel. The obtuse angle also provides that the support channels form a substantially horizontal base when the support members are flexed outward by the tensioning member.

According to an aspect of the invention, a mounting system may be configured into a compact, environmentally friendly package for shipping and distribution. The tensioning member and a product label, as well as the two support members, are secured by the fastening element to form a compact shipping and sales package.

According to an aspect of the invention, a method of assembling a mounting system package includes the steps of providing two support members, a tensioning member and a label, each having holes or apertures therein; stacking the support members and tensioning member to align respective holes or slots therein; wrapping a label around the stacked support members and tensioning member to align holes in the label with the aligned holes in the support members and tensioning member; and inserting a fastener through the aligned holes to secure the package together. The fastener may have the dual function of securing the packaging together as well as functioning as a fastener for the mounting device when it is in operation in either the wall mounted or shelf-mounted configuration. Thus, the package is assembled in a secure manner with a minimum of waste material.

DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples and are not intended to be limiting to the scope of invention, which is set forth in the claims appended hereto.

FIG. 1 is a perspective showing a mounting system in a hanging or wall-mounted configuration according to an aspect of the invention.

FIG. 2 is a front perspective showing a collectable in a mounting system in a hanging configuration according to an aspect of the invention.

DETAILED DESCRIPTION

Figure 4:
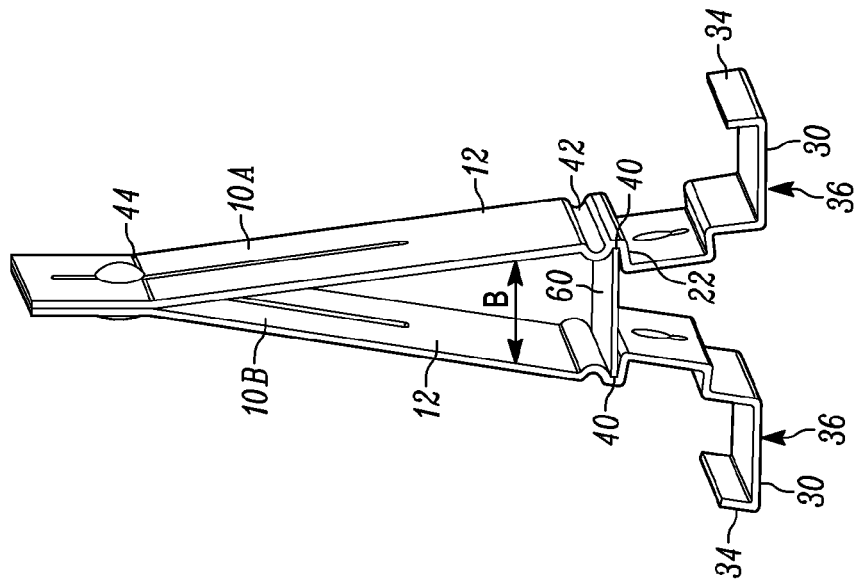
FIG. 4 is a perspective showing a mounting system in a standing or shelf-mounted configuration according to an aspect of the invention.

Referring to FIG. 1, a mounting assembly in a hanging configuration according to an aspect of the invention includes two generally J-shaped support members, referenced generally as 10A and 10B. Each support member includes a generally planar main body section 12, having an elongated adjustment slot 14 formed therein. Support members 10A and 10B may be formed, for example, by extrusion molding of a suitable plastic, such as polystyrene or polyethylene, which may be transparent. The support members 10A and 10B may be adjustably fastened together using a fastener 16, which may comprise a low-profile (short length) threaded fastener, such as a carriage bolt and nut, disposed in aligned adjustment slots 14.

Each support member includes an offset portion 20, which may include a first leg 22 and second leg 24 extending to a wall-engaging surface 26, which functions to support and displace the assembly slightly outward away from the wall when the assembly is hanging. A hanger receiving slot or hole 28 for receiving a nail or other hanging implement may be formed in the wall-engaging surface 26. Support members 10 also include a channel section 30 for supporting the collectable and including a collectable support surface 32 and a retaining lip 34. The support surface 32 may extend at a slightly obtuse angle "A" from the plane of the planar section 12, such that when the assembly is hanging on a wall, gravity will force the collectible downward and to the left in FIG. 1 against the right surface of retaining lip 34.

Figure 3:
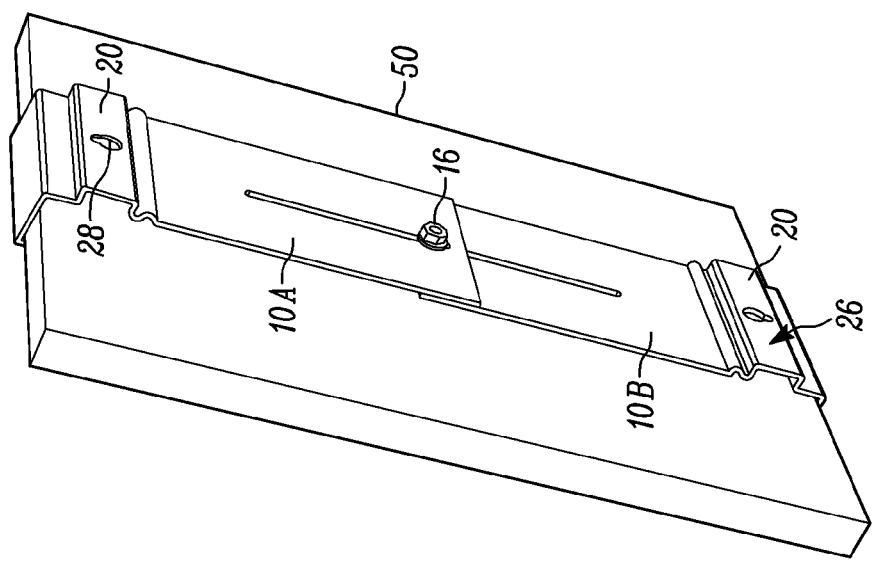
FIG. 3 is rear perspective of the system and collectable of FIG. 3.

Referring additionally to FIGS. 2 and 3, the assembly may be adjusted the to the length of the collectable 50 such that the channels 30 firmly engage the ends of the collectable 50. As shown in FIG. 2, the retaining lips 34 extend only slightly over the edges of the collectable. Moreover, the slight angle on the support surfaces 32, cause the collectable to rest against the retaining lips 34 as well as rendering the support surfaces 32 hidden from view from a frontal direction. Thus, when hung on a wall, the retaining lips 34 are the only visible elements of the mounting assembly, creating an aesthetically pleasing display of the collectable that does not detract from the presentation of the collectable. The support members may be formed of a transparent plastic to further minimize visibility and aesthetic benefit of the mounting assembly. Moreover, the two offset portions 20 support the collectable in a stable manner on the wall and in a position that is slightly displaced from the wall, creating the visual effect that the collectable is "floating."

Referring to FIG. 4, according to an aspect of the invention, the mounting assembly may be quickly and easily configured into an alternative, standing shelf-mounted configuration for displaying the collectable on a horizontal surface. In the standing configuration, the support members 10A and 10B are fastened in an orientation in which the channel sections 30 extend in generally opposite directions, forming a base of the assembly. The support members are fastened to one another with the fastener 16 as shown. The support members 10A and 10B include a tensioning member receiving slot 40, formed between a retaining ridge 42 and the first leg 22 of the offset portion 20, for receiving a tensioning member 60, which may be a planar piece of cardboard, plastic or other rigid material. The tensioning member 60 may be slid into the opposed receiving slots 40 such that the support members are forced and flexed outward from each other at an angle B. This tensioning increases the strength and rigidity of the assembly. Owing to the angle A of the channel section 30 and support surfaces 32 relative to the planar sections 12, the channel sections assume a substantially horizontal orientation when the support members 10A and 10B are forced into the configuration shown, thereby orienting the undersides 36 of channel sections 30 to engage the horizontal surface on which the assembly rests. The collectable (not shown in FIG. 4) may be supported in the channel 30 for display, with the retaining lip 34 being the only visible portion of the assembly from a frontal direction. FIG. 4 illustrates a hinge 44 that may be formed in the support members 10A and 10B according to an alternative exemplary embodiment from that shown in FIGS. 1-3. Hinge 44 may be a groove that provides for bending of the support members at a desired location, as well as control of the tension force required for tensioning member 40 to keep the support members 10A and 10B apart. As will be recognized, without the hinge 44, the support members may flex generally along their length when forced outward by the tensioning member 60.

Figure 5:
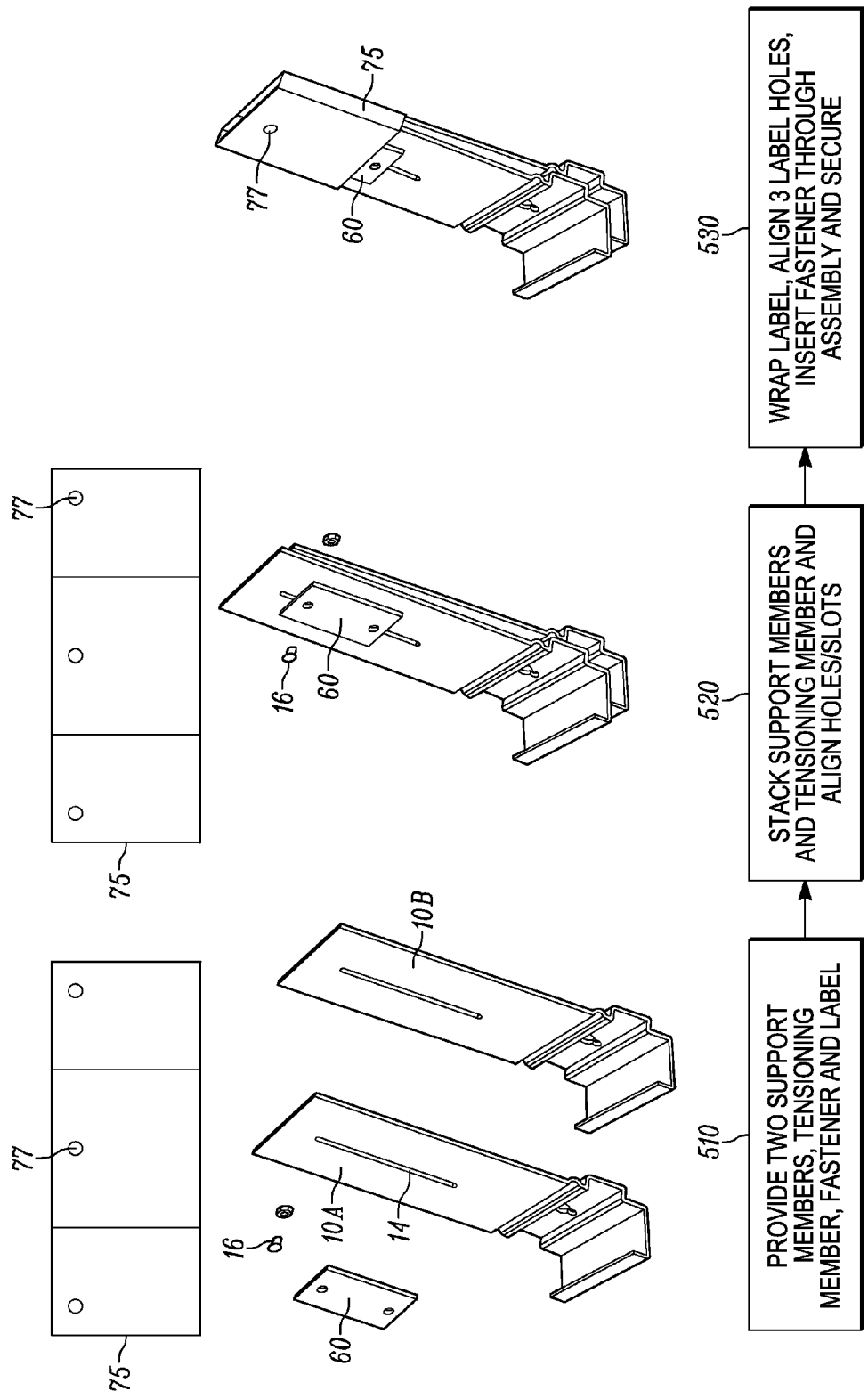
FIG. 5 illustrates a packaging configuration and method of assembling a package of a mounting system according to an aspect of the invention.

According to another aspect of the invention, a packaging configuration for the mounting assembly provides an environmentally friendly and compact package for sale and distribution of the product. Referring to FIG. 5, a process for assembling the packaging configuration comprises first providing, at step 510, two support members 10A and 10B, tensioning member 60, having at least one aperture, wrapping label 75 and fastener 16. At step 520, the support members 10A and 10B are stacked, as is tensioning member 60, with the hole in tensioning member 60 and the adjustment slots 14 aligned. At step 530, the wrap label 75 is wrapped around the assembly such that the label holes are aligned with the hole in tensioning member 60 and with the adjustment slots 14. Although three label holes 77 are illustrated, it will be recognized that the label 75 may be affixed using a single hole or two holes, and folded over the tops of support members instead of wrapped around them. Fastener 16 is then inserted through the entire assembly and secured using a nut. The assembled package includes two support members 10A and 10B, which may be oriented such that the channel sections 30 extend in the same direction, and in which the adjustment slots are aligned, tensioning member 60 and wrapping label 75 all secured with fastener 16. Thus, the fastener 16—which is the same fastener used in operation of the device in the wall mounted or shelf mounted configurations—extends through first label aperture, the tensioning member aperture, the two adjustment slots 14 of the support members 10A and 10B, and the apertures of the product label to secure all components together in a compact package that results in minimal discarded waste.

It should be understood that implementation of other variations and modifications of the invention in its various aspects may be readily apparent to those of ordinary skill in the art, and that the invention is not limited by the specific embodiments described herein. It is therefore contemplated to cover, by the present invention any and all modifications, variations or equivalents. For example, the support members and other components, such as the tensioning member, may be formed or fabricated from materials other than the particular plastic materials described, including metals, such as aluminum or steel, or other materials. Moreover, the support members and other components may be made by processes other than extrusion, such as stamping or injection molding.

What is claimed is:

1. A mounting device for collectables, the mounting device being configurable to a wall-mounted configuration, in which the mounting device supports a collectable on a wall, and a horizontal support surface mounted configuration, in which the mounting device supports a collectable on a horizontal surface, the mounting device comprising:
   a pair of support members, each support member including:
   a) a generally planar main body portion;
   b) a fastener receiving aperture formed in the main body section for receiving a fastener to fasten the support members to one another;
   c) a tensioning member receiving slot formed in the support member for receiving a tensioning member when the mounting device is in the horizontal support surface mounted configuration, to force apart and maintain the support members in a flexed state and thereby create tension in the support members;
   d) a wall engaging section having wall engaging surface formed in the support member and offset from the plane of the main body portion, for engaging a wall when the mounting device is in the wall-mounted configuration; and
   e) a channel section extending from the main body portion for engaging and supporting the collectable and for engaging a horizontal surface when the device is configured to the horizontal support surface mounted configuration.

2. The mounting device of claim 1, further comprising a tensioning member for forcing apart and maintaining the support members in a flexed state and thereby creating tension in the support members.

3. The mounting device of claim 1, wherein the tensioning member receiving slot is formed by a retaining ridge formed in the support member and a leg portion that supports the wall engaging surface.

4. The mounting device of claim 1, wherein the channel section of each support member extends at an angle to the main body portion that is greater than 90 degrees such that the channel section extends substantially horizontally when the device is in the horizontal support surface mounted configuration.

5. The mounting device of claim 1, wherein each support member is formed as a unitary, extruded plastic piece.

6. The mounting device of claim 1, further comprising a retaining lip on the channel section of each support member.

7. The mounting device of claim 1, further comprising a hanger receiving aperture formed in the wall engaging section of each support member for receiving a hanger to support the device on a wall when the device is in the wall engaging configuration.

8. The mounting device of claim 1, further comprising a hanger receiving slot formed in the wall engaging section.

9. A mounting device for collectables, the mounting device being configurable to a wall-mounted configuration, in which the mounting device supports a collectable on a wall, and a horizontal support surface mounted configuration, in which the mounting device supports a collectable on a horizontal surface, the mounting device comprising:
   a pair of support members, each support member including:
   a) a main body portion;
   b) a fastener receiving aperture formed in the main body section for receiving a fastener to fasten the support members together;
   c) a tensioning member receiving slot formed in each support member for receiving a tensioning member when the mounting device is in the horizontal support surface mounted configuration to force apart and maintain the support members in a flexed state and thereby create tension in the support members;
   d) a wall engaging section having wall engaging surface and offset from the main body portion, for engaging a wall when the mounting device is in the wall-mounted configuration; and
   e) a channel section extending from the main body portion for engaging and supporting the collectable and for engaging a horizontal surface when the device is configured to the horizontal support surface mounted configuration.

10. The device of claim 9, wherein the support members are fastened together such that the channel sections extend in the same general direction.

11. The device of claim 9, wherein the support members are fastened together such that the channel sections extend in opposite general directions.

12. The device of claim 9, wherein the support members are formed as extruded members.

13. The device of claim 9, wherein the tensioning member is provided with a mounting aperture such that the tensioning member and the support members can be fastened together with the fastener.

14. The device of claim 9, wherein the channel section of each support member extends at an angle with the main body portion that is greater than 90 degrees such that the collectable is forced by gravity against a retaining lip when the collectable is supported on the channel section when the device is in the wall mounted configuration.

15. The device of claim 9, further comprising a product label, having indicia thereon, and being provided with at least two fastening holes, the fastening holes being positioned such that the label may be wrapped around the support members and the fastening holes aligned to receive the fastener to provide an integrated package.

16. A method of assembling a package comprising a pair of support members, each support member including:
   a) a main body portion;
   b) a fastener receiving aperture formed in the main body section for receiving a fastener to fasten the support members together;
   c) a tensioning member receiving slot formed in each support member for receiving a tensioning member when the mounting device is in the horizontal support surface mounted configuration to force apart and maintain the support members in a flexed state and thereby create tension in the support members;

d) a tensioning member for forcing apart and maintaining the support members in a flexed state and thereby creating tension in the support members, the tensioning member having an aperture;

the method comprising:

providing the pair of support members;

stacking the support members and tensioning member;

providing a label having at least two label apertures;

wrapping the label around the support members and tensioning member;

aligning the the tensioning member aperture, the support member fastener receiving apertures and the label apertures;

fastening the support members, tensioning member and label together by inserting a fastener through the aligned tensioning member aperture, support member apertures and label apertures by inserting a fastening with a fastener.

* * * * *